Nov. 24, 1931.                M. WILDERMAN                1,833,101
                                FILTER PRESS
                           Filed Oct. 26, 1929        2 Sheets-Sheet 1
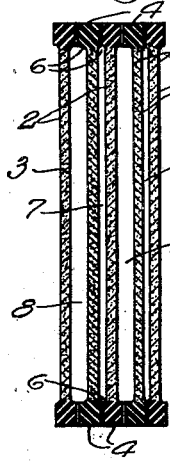
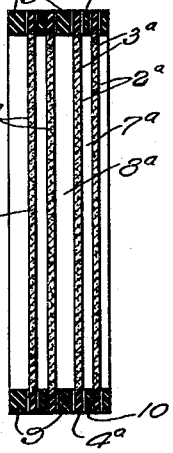
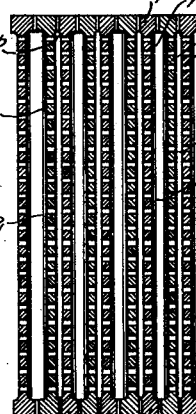
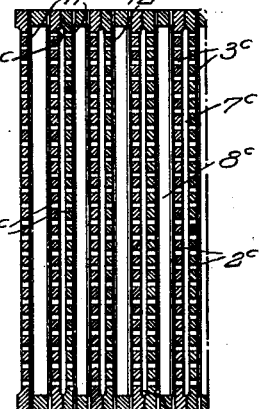
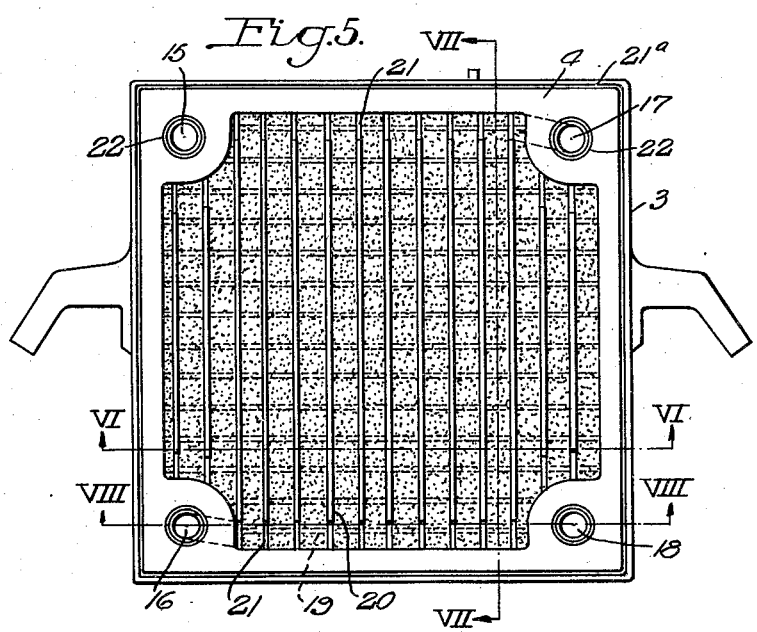
INVENTOR Nov. 24, 1931.   M. WILDERMAN   1,833,101
FILTER PRESS
Filed Oct. 26, 1929   2 Sheets-Sheet 2
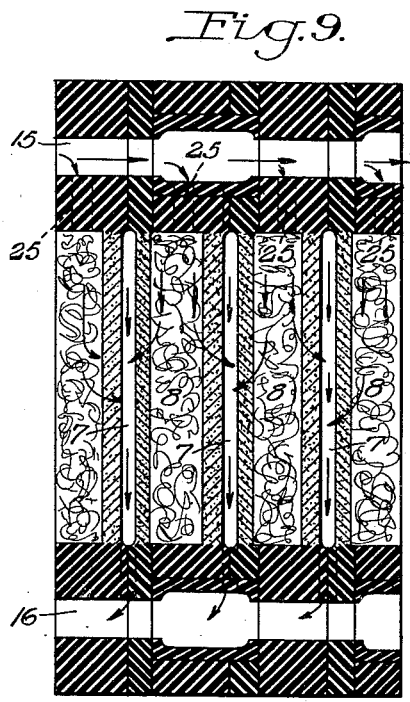
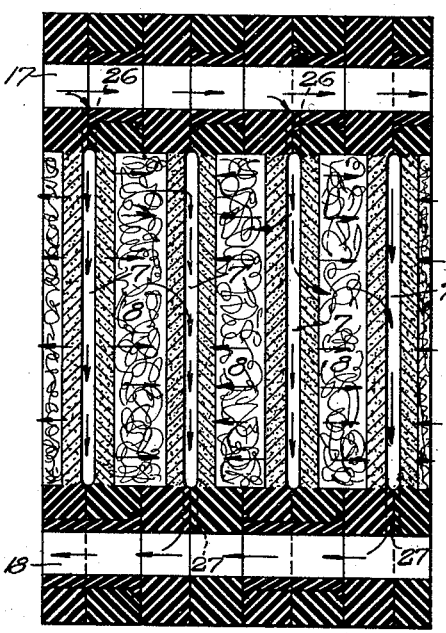
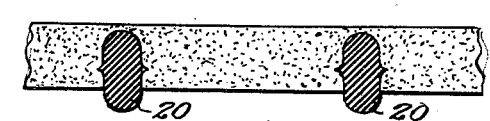

Patented Nov. 24, 1931

1,833,101

UNITED STATES PATENT OFFICE

MEYER WILDERMAN, OF HAMPSTEAD, LONDON, ENGLAND, ASSIGNOR TO THE AMERICAN WILDERMAN POROUS EBONITE COMPANY, INC., OF PHILADELPHIA, PENNSYLVANIA, A CORPORATION OF PENNSYLVANIA

FILTER PRESS

Application filed October 26, 1929, Serial No. 402,696, and in Great Britain November 10, 1927.

This invention relates to filter presses, and more particularly to filter presses containing a series of double filters, each double filter consisting of two single filter plates provided with independent frames, the single filter plates being arranged so as to provide a space within the double filters for the filtrate, and a space between adjacent double filters for the residue.

This application is a continuation-in-part of my co-pending application Serial No. 305,373, filed September 12, 1928.

Filter presses which are generally in use at the present time consist of a series of solid metal or wooden plates having projections or ribs thereon which support a filtering medium such as filter cloth. In the filtering process the filtrate flows through the filtering medium into the channels formed by the projections on the plates and thence to the exit of the press.

This type of filter press has several disadvantages among which may be mentioned, first, during the filtering operation the filter cloth sags between the supporting projections or ribs, tending to tear the cloth and also decreasing the speed of filtration; second, the ribs or projections on the solid plate which support the filter cloth decrease the effective filtering surface of the filter; third the materials of which the plates are made will not withstand the action of certain chemicals, so that it is necessary in different processes to select materials suitable to the solutions which are being filtered.

In accordance with my invention I provide a series of double filters, each double filter containing two single filters with individual rims which provide spaces within the double filters for the filtrate and spaces between the double filters for the residue. The preferred material of which the filter plates are made is porous ebonite. The plates may be made in accordance with the process described in my Patent No. 1,651,567, granted December 6, 1927.

In the accompanying drawings two present preferred forms of my invention are given by way of illustration.

Figures 1 to 4 are diagrammatic cross-sectional views showing the assemblage of filter plates in a filter press. Figures 1 and 2 illustrate an embodiment in which the main body of the plates is made of porous ebonite and the rims are made of non-porous ebonite. Figs. 3 and 4 illustrate an embodiment in which the main body of the plates is formed of perforated metal plates having wire gauze and filter cloth secured thereto, Fig. 5 is a plan view of a single filter plate, two of these single filter plates forming a double filter plate having a space within for the filtrate, Figure 6 is a horizontal section on the line VI—VI of Fig. 5, Figure 7 is a vertical section on the line VII—VII of Fig. 5, Figure 8 is a horizontal section of a double filter plate taken on a line corresponding to the line VIII—VIII of Fig. 5, Figure 9 is a vertical sectional view through a filter press illustrating the filtering operation, and Figure 10 is a view similar to Fig. 9 illustrating the washing operation.

Figure 11 is a detailed view on an enlarged scale, showing the shape of the ribs on the filter.

Referring to the embodiment shown in Fig. 1, the filter press comprises a series of double filters 2, each double filter consisting of two single filter plates 3. The main body of the single filter plates 3 is made of porous ebonite, but the rims 4 are made of non-porous ebonite. The rims 4 are recessed as indicated at 6 so that when two single filter plates 3 are assembled they provide a space 7 within each double filter for the filtrate and a space 8 between adjacent double filters for the residue.

The embodiment illustrated in Fig. 2 is similar to the embodiment of Fig. 1 except that instead of forming recesses in the rims, separating frames 9 are employed between the double filters 2$^a$, and separating frames 10 are employed between the single filter plates 3$^a$. As in the embodiment shown in Fig. 1, the main body of the single filter plates 3$^a$ is made of porous ebonite and the separating frames 9 and 10 as well as the rims 4$^a$ are made of non-porous ebonite.

In the embodiment illustrated in Fig. 3 the double filters each consist of two single filter plates 3ᵇ. The body of the plates is perforated and both the body and rim 4ᵇ are metal. A gauze filtering screen 11, indicated by the heavy line, and a filter cloth 12 indicated by the light line, are secured to the filtering surfaces of the plates 3ᵇ. The rims 4ᵇ are recessed in a manner similar to that described in connection with the embodiment shown in Fig. 1.

In the embodiment illustrated in Fig. 4, perforated metal plates 3ᶜ covered with a gauze filtering screen 11ᶜ, indicated by the heavy line, and filter cloth 12ᶜ, indicated by the light line are employed. The double filters are separated by rims 9ᶜ. The frames 4ᶜ of the single filter plates 3ᶜ are recessed as indicated at 6ᶜ. When the filter plates are assembled in the press they provide spaces 7ᶜ within the double filters 2ᶜ and spaces 8ᶜ between the double filters.

In cases where perforated metal plates are used, both the rim and body portions may be covered with a thin layer of non-porous ebonite in order to protect the plates from the action of such chemicals as would attack them.

Referring to Figs. 5 to 8, inclusive, each single filter plate 3 comprises a rim 4 of non-porous ebonite and a main body portion of porous ebonite. The rim 4 is provided with an opening 15 which forms an inlet for the solution to be filtered, an opening 16 which forms an outlet for the filtrate, an opening 17 forming an inlet for wash water, and an opening 18 forming an outlet for the wash water.

In order to aid the filtering process the openings 15 and 17 may be connected to a source of pressure and the openings 16 and 18 to a source of suction. The filter plate has horizontal ribs 19 of non-porous ebonite and vertical ribs 20 of metal covered with non-porous ebonite which form a grid which supports the porous ebonite filtering medium.

Preferably the horizontal ribs 19 and the vertical ribs 20 are chosen of such a section that the apertures formed by them represent a double cone (see Figure 11), the two wider bases of the double cone of each aperture being turned to the two outer sides of the porous filter, the object being to increase the surface of filtration, to create a larger surface of combination between the porous filter within the aperture and the non-porous ebonite of the grid, and to support the porous filters against pressure during filtration or washing of the cake.

As shown in Figs. 5, 7 and 8, the horizontal ribs 19 are embedded in the porous ebonite filtering medium, but the vertical ribs 20 extend beyond the porous ebonite into the space between the double filters. Portions of the ribs 20 adjacent their ends are cut out as indicated at 21 (Figures 5 and 7) to provide spaces for the free flow of solution to the inlet and outlet openings 15, 16, 17 and 18.

As shown in Fig. 8, the vertical ribs 20 project beyond the surface of the porous ebonite and contact with the horizontal ribs 19 in the opposite plate of the double filter. Grooves 21ᵃ are provided on each surface of the frames 4 adjacent their peripheries, and similar grooves 22 are provided adjacent the openings 15, 16, 17 and 18. The grooves are filled by gaskets 23 which insure a tight joint between the filter plates when they are assembled in the filter press.

Figure 9 illustrates the filtering process. The solution to be filtered flows through the opening 15, through the openings 25 leading to the spaces 8 between the double filters. The filtrate passes through the single filter plates into the spaces 7 within the double filters and from there passes into the outlet passage 16.

In the washing operation, the washwater enters through the passage 17 and flows through openings 26 into alternate spaces 7 within alternate double filters. From the spaces 7 the wash water flows in opposite directions, as indicated by the arrows, through the cake or residue contained in the spaces 8 between adjacent double filters, and then through the single filter plates to the spaces 7' within the double filters. From the spaces 7' the wash water flows through passages 27 into the outlet passage 18.

Instead of making the rim and grid of non-porous ebonite, they may be made of metal covered with non-porous ebonite.

In ordinary practice, when porous ebonite filter plates are employed it is unnecessary to use filter cloth, but if desired in order to prevent the precipitate from contacting with the porous ebonite or to facilitate the removal of the precipitate from the press, thin filter cloth, filter paper et cetera may be usefully employed.

I have illustrated and described several preferred forms of my invention. It is to be understood, however, that the invention is not restricted to these and may be otherwise embodied within the scope of the following claims.

I claim:

1. A filter press comprising double filter plates, each double filter containing single filter plates with individual rims providing a space within the double filter plates for the filtrate, in which the single filter plates of the double filter are provided with ribs which strengthen them, the ribs projecting into the spaces within the double filter and contacting with ribs on the opposite plate of the double filter in order to support the single plates against the pressure of the solution being filtered.

2. A filter press provided with inlet and outlet openings, comprising double filter plates, each double filter plate containing single filter plates with individual rims providing a space within the double filter plates for the filtrate, in which the filter plates of the double filter are provided with ribs which strengthen the single filter plates, the ribs projecting into the spaces within the double filter plates and contacting with the opposite plate of the double filter in order to support the single plates against the pressure of the solution being filtered, portions of the ribs adjacent the top and bottom thereof being cut away in order to allow free flow of solution to the inlet and outlet openings.

3. A filter press comprising double filter plates, each double filter plate containing single filter plates with individual rims providing a space within the double filter plates for the filtrate, in which the single filter plate consists of grids formed of cross members connected at their ends to the rim, the rim and cross members being made of metal covered with a non-porous substance, the spaces between the cross members containing a porous filtering medium, the rim and cross members and filtering medium forming a unitary structure.

4. A filter press comprising double filter plates, each double filter plate containing single filter plates with individual rims providing a space within the double filter plates for the filtrate, in which the single filter plates consist of grids formed of cross members connected at their ends to the rim, the rim and cross members being made of metal covered with non-porous ebonite, the spaces between the cross members containing porous ebonite, the frame and cross members and porous ebonite forming a unitary structure.

5. A filter press comprising double filter plates, each double filter plate containing single filter plates with individual rims providing a space within the double filter plates for the filtrate, in which the single filter plates consist of grids formed of cross members connected at their ends to the rim, the rim and some of the cross members being made of metal covered with non-porous ebonite, while the rest of the cross members is made of non-porous ebonite, the spaces between the cross members containing porous ebonite, the rim and cross members and porous ebonite forming a unitary structure.

6. A filter press comprising double filter plates, each double filter containing single filter plates with individual rims providing a space within the double filter plates for the filtrate, in which each of the single filter plates of the double filter is composed of a perforated metal plate having filtering means supported thereon, the perforated metal plates having ribs projecting into the space within the double filter and contacting with ribs on the opposite plate of the double filter in order to support the single plates against the pressure of the solution being filtered.

In testimony whereof I have hereunto set my hand.

MEYER WILDERMAN.